Figure 1:
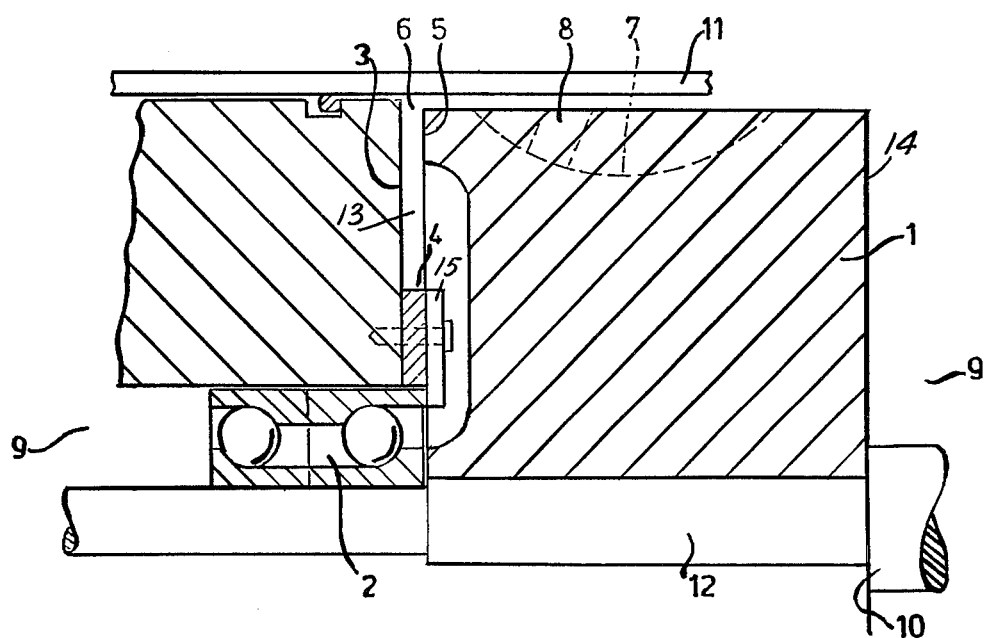

United States Patent [19]

Hodge

[11] 4,105,378

[45] Aug. 8, 1978

[54] SEALING ARRANGEMENT

[75] Inventor: Jonathan Martin Hodge, London, England

[73] Assignee: Momovis B.V., Amsterdam, Netherlands

[21] Appl. No.: 712,743

[22] Filed: Aug. 9, 1976

[30] Foreign Application Priority Data

Aug. 18, 1975 [GB] United Kingdom ............... 34215/75

[51] Int. Cl.² ............................................. F04C 17/10
[52] U.S. Cl. .................................... 418/195; 418/144
[58] Field of Search ................ 418/195, 144, 141, 140

[56] References Cited

U.S. PATENT DOCUMENTS

| | | | |
|---|---|---|---|
| 1,670,681 | 5/1928 | Haas | 418/144 |
| 3,841,806 | 10/1974 | Zimmern | 418/195 |
| 3,945,778 | 3/1976 | Zimmern | 418/195 |
| 3,976,407 | 8/1976 | Gerlach | 418/144 |

*Primary Examiner*—C. J. Husar
*Attorney, Agent, or Firm*—Lane, Aitken, Dunner & Ziems

[57] ABSTRACT

A single screw, gate rotor machine used as a gas compressor in which compressible fluid is fed to the machine through a low pressure inlet and exhausted through a high pressure outlet and in which an effective seal between the screw and the casing at an end of the screw across which a pressure difference occurs is located in a clearance formed between the casing or a part stationary with the casing and a generally extending surface of the screw closely adjacent thereto.

1 Claim, 2 Drawing Figures

SEALING ARRANGEMENT

This invention relates to an improvement in a known kind of fluid working machine, notably a single screw, gate rotor machine which may be employed as a compressor, a motor or a pump.

Our prime interest is with regard to single screw, gate rotor machines when used as compressors (e.g. for compressing air or a refrigerant vapour or gas) and for simplicity, the following specification will refer to the mode of use in which compressible fluid is fed to the machine through a low pressure inlet port and is exhausted from the machine through a higher pressure outlet port. It should be appreciated, however, that it is believed that the invention applies equally to alternative modes of operation in which the machine is used to generate kinetic energy from a fluid supplied at high pressure (i.e. operation as a motor).

This invention is specifically concerned with fluid working machines of the kind comprising a screw rotatable about an axis and having surface grooves formed therein which are inclined relative to that axis, the lands, serving to separate the grooves one from another, making sealing engagement with a surrounding casing whereby each groove defines, during at least a part of the rotation of the screw, a chamber, at least one gate rotor having teeth which intermesh with the grooves of the screw, each tooth being successively in sealing relationship with a groove as the intermeshing screw/rotor(s) rotate, the volume of any chamber defined by a groove and limited by a rotor tooth changing from a maximum to a minimum as the screw and rotor(s) rotate, at least a high pressure port in the casing adjacent to a high pressure end of the screw and communicating with each chamber when the volume thereof is at, or adjacent to, its minimum volume and at least a low pressure port at a low pressure end of the screw. Throughout this specification a fluid working machine of the kind just described, will be referred to as a "fluid working machine of the kind specified".

With a fluid working machine of the kind specified, there are advantages in operating the machine so that opposite ends of the screw are at the same operating pressure, since this minimizes the thrust loading on the bearings of the screw.

In the case of a compressor, both ends of the screw will be at suction pressure and leakage of worked fluid will tend to occur at the high pressure end of the screw, from grooves at high pressure to the end space via the clearance between the screw and the casing. When compressors are water or oil injected, sufficient liquid can be used to ensure that the clearance is flooded and so minimize the loss of compressed gaseous worked fluid.

When the clearance is liquid flooded however, the liquid migrates to the low pressure region instead of the gaseous worked fluid. This liquid will be warm, having absorbed some of the heat of compression and will tend to warm incoming worked fluid and so reduce the compressor throughout. For this reason, it still remains important to keep leakage to a minimum.

When the gaseous worked fluid is soluble to an appreciable extent in the liquid, an additional loss arises when this liquid leaks through the clearance. As the pressure falls, gas is released from the liquid and this contributes to an addditional volumetric loss. An example of this situation is an oil-injected compressor with standard refrigerant R22 or R12 as the worked fluid.

A still more serious situation arises when the liquid which is injected is the liquid phase of a vapour serving as the worked fluid being compressed. A system of this type is disclosed in the specification of our British Pat. Nos. 1,352,698 and 1,352,699 and our copending application 53666/73. In this case a certain percentage of the vapour evaporates as the pressure falls and it is absolutely essential to minimise the loss from the delivery to the suction pressures.

Previous designs of compressor based on fluid working machines of the kind specified have relied on maintaining a small radial clearance between a plain part of the screw at the delivery end and the casing. However, this clearance is subject to variations within the limits of screw diameter, bore diameter, bearing internal clearance, concentricity of screw bore and bearing bore and of shaft and screw. The tolerance on the clearance will thus be the sum of all these tolerances.

This tolerance may be reduced by greater accuracy in the construction of the machine but this adds considerably to production costs.

The invention relates to an improved design of fluid working machine of the kind specified which enables the tolerance on the critical clearance to be reduced without the need for greater accuracy in the construction of the machine.

According to the present invention a fluid working machine of the kind specified is characterised in that the effective seal between the screw and the casing at an end of the screw across which a pressure difference occurs is located in a clearance formed between the casing or a part stationary with the casing and a generally radially extending surface of the screw closely adjacent thereto.

Conveniently the generally radially extending surface may be an end face of the screw. Where the pressure difference occurs at the high pressure end of the screw, said sealing clearance can be between an end part of the casing, in which the screw bearing is housed, and the high pressure end face of the screw.

With this arrangement it is the axial position of the screw within the casing which is critical for effective control of the sealing clearance. However, the axial position of the screw is also important for providing satisfactory meshing between the screw and the gate rotor(s), a condition which is essential to maintain small sealing clearances between the screw and the gate rotor(s).

The use of the axial sealing arrangement does not therefore require additional accurate elements in the construction of the machine.

Suitably the location of the thrust bearings, which control the screw position, and the end sealing member are controlled from the same datum face. Thus the tolerance on the sealing clearance will be only the tolerance on shim thickness (or other axial positioning device) plus the bearing internal clearance and will hence be very small.

Figure 2:
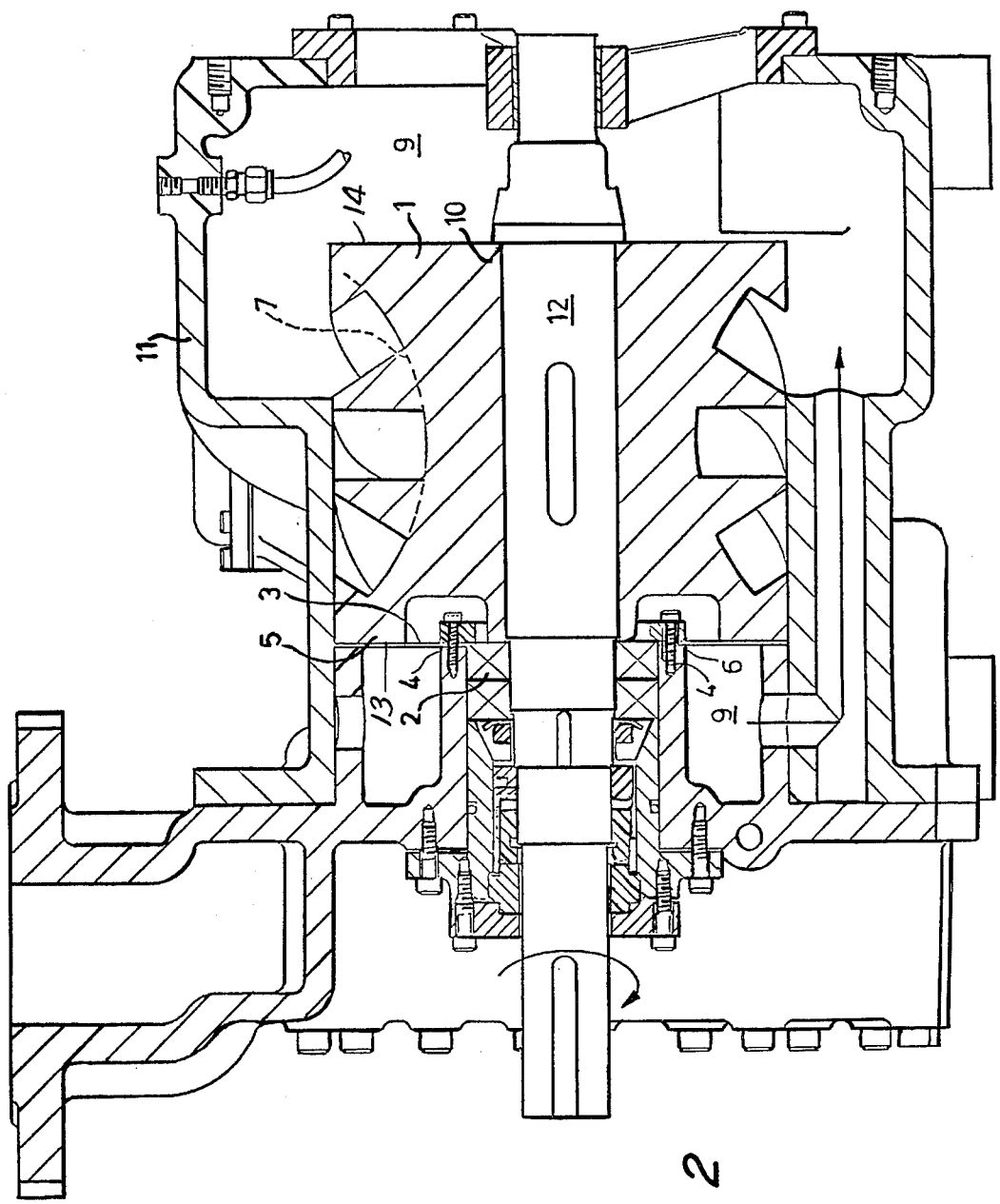

The invention will now be more fully described, by way of example, with reference to the accompanying drawings, in which:

FIG. 1 is a schematic representation in longitudinal section of the high pressure end of a fluid working machine of the kind specified showing the location of the sealing clearance, and FIG. 2 is a more detailed longitudinal section, in a plane normal to that employed for the section of FIG. 1, showing the means for controlling the clearance in greater detail.

Referring to FIG. 1, the screw of the machine is shown at 1 and the casing at 11. The screw 1 is fast on a shaft 12 rotatably mounted within the casing 11 by, inter alia, a thrust bearing 2 (here shown as an angular contact ball bearing). The high pressure end of the screw is identified by the numeral 13, and the low pressure end by the numeral 14. The position of the thrust bearing 2 is controlled in relation to a datum face 3 of the casing 11, by a packing shim 4, maintained in position by a plate 15. In this case, it can be seen that if the face 3 is machined flat and an end face 5 of the screw 1 is also flat, then the clearance gap 6 (much enlarged for the sake of clarity in FIG. 1) is equal in dimension to the thickness of the packing shim 4. The dotted line 7, schematically represents the position of the grooves in the screw 1 and 8 schematically represents the tooth of a gate rotor cooperating with the screw 1 (not shown further). The high pressure end of the grooves are thus in communication with a low pressure region 9 of the casing 11, via the clearance gap 6.

The tolerance on the gap 6 is therefore dependent only on the tolerance on the shim thickness and the axial movement in the bearing 2. The position of the shaft 12 is located by a shouler 10, and its position is less accurately defined, being dependent on the length of the screw 1.

FIG. 2 shows a practical embodiment of the machine in accordance with the invention, from which the grooves in the screw 1 can be clearly seen. FIG. 2 also shows the bearings for the shaft 12 and the communication between the two regions 9 of low pressure. Even if FIG. 2 shows that the bottoms of the grooves, in cross section of the screw, lie in a circle, as it happens when using flat gate rotors having their teeth lying in a plane passing by the axis of the screw, the invention applies to cases where the teeth are disposed on different surfaces such as on a cone or on a cylinder and whereby the bottom of the grooves, in a cross section of the screw, lies no more on a circle.

Also the face 5 of the screw 1 and the part 3 stationary with the casing have been represented as cooperating along a flat surface; but obviously it could have been of different shape such as conical without changing the scope and interest of the invention.

Location of the effective seal at the end face of the screw 1 has the following additional advantages:

1. In a machine where the pressure obtaining in the casing (suction pressure) is different from ambient, a thrust loading will be introduced on the shaft by virtue of the shaft projecting from the casing. In this situation, the machine can be designed so that this is balanced by the thrust load produced at the periphery of the screw due to the pressure in the clearance gap (which will vary between suction and discharge pressure across the gap).

2. Temperature differences between the screw and the casing will not affect the clearance gap and so no thermal expansion allowance needs to be made. This is a further uncertainty in the gap dimension in the prior art machines which can be eliminated in accordance with the invention and thus make it possible to specify a narrower gap.

3. When liquid is present in the sealing gap, this liquid will tend to acquire a rotation, especially that liquid adjacent to the moving screw. When equilibrium conditions are reached, there will tend to be less flow radially inward through the gap, because the pressure gradient is partially balanced by the centrifugal force introduced by the rotating liquid. Vanes may be provided on the end face of the screw to induce rotation of more of the liquid. Such vanes could be radial and, if thin, may be initially in contact with the casing part and wear to give the closest fit possible.

4. It is sometimes desirable to check the free running properties of the screw on its bearings with the clearance seal set to the required limits. In the case of a radial clearance seal, the seal clearance can only be set when the screw is located within the casing. With this arrangement, if the required free-running feature of the screw is not obtained it will not be known whether this is due to maladjustment of the seal surfaces or to some other cause. In the case of embodiments of machine in accordance with the invention, the clearance between the end of the screw and the stationary casing part at which the effective seal is made, can be adjusted to ensure the correct clearance and free-running of the screw before the screw is inserted in the casing.

5. Since the stationary casing part which contributes to the formation of the seal can be present for that purpose only, it can be fabricated from a plastics material (e.g. a low friction plastics material such as polytetrafluoroethylene) a surface of this plastics material initially making light interference contact with the tips of a labyrinth or spiral seal formed on a radial face of the end of the screw.

I claim:

1. In a positive displacement rotary machine comprising a screw rotatable about an axis and having surface grooves formed therein which are inclined relative to that axis, the lands, serving to separate the grooves one from another, making sealing engagement with a surrounding casing whereby each groove defines, during at least a part of the rotation of the screw within the casing, a chamber, at least one gate rotor having teeth which intermesh with the grooves of the screw, each tooth being successively in sealing relationship with a groove as the intermeshing screws/rotor(s) rotate, the volume of any chamber defined by a groove and limited by a rotor tooth changing from a maximum to a minimum as the screw and rotor(s) rotate, at least a high pressure port in the casing adjacent to a high pressure end of the screw and communicating with each chamber when the volume thereof is at, or adjacent to, its minimum volume and at least a low pressure port at the low pressure end of the screw, the improvement comprising means to establish an effective seal between the screw and the casing at an end of the screw across which a pressure difference occurs, said seal means including a generally radially extending surface of the screw adjacent to the portion of the screw in sealing engagement with the surrounding casing and a part stationary with the casing of same outside diameter as said surface and closely adjacent thereto.

* * * * *